United States Patent [19]
Onken

[11] Patent Number: 4,624,468
[45] Date of Patent: Nov. 25, 1986

[54] WHEEL CARRIAGE ACCESSORY FOR RENDERING WASTE CONTAINERS MOVEABLE

[76] Inventor: Donald R. Onken, P.O. Box 72, Easton, Ill. 62633

[21] Appl. No.: 858,877

[22] Filed: May 2, 1986

Related U.S. Application Data

[63] Continuation of Ser. No. 650,174, Sep. 13, 1984, abandoned.

[51] Int. Cl.$^4$ ............................................. B62B 13/18
[52] U.S. Cl. .......................... 280/43.2; 280/47.13 R; 414/446; 414/457
[58] Field of Search ............... 280/43.1, 43.24, 43.17, 280/43.2, 43, 46, 47.13 R, 47.15; 242/86.5 R, 58.6; 414/444, 446, 457, 490, 498, 458, 555, 546

[56] References Cited

U.S. PATENT DOCUMENTS

| | | | |
|---|---|---|---|
| 759,495 | 5/1904 | Baines | 414/446 |
| 2,816,674 | 12/1957 | Koontz | 414/457 |
| 2,880,431 | 4/1959 | Noland | 280/43.1 |
| 2,996,307 | 8/1961 | Dedailleux | 290/43.17 |
| 3,116,809 | 1/1964 | Nissen | 280/47.13 R |
| 3,900,202 | 8/1975 | Doble | 280/43.24 |
| 3,945,661 | 3/1976 | Priefert | 280/46 |
| 4,450,828 | 5/1984 | Onken | 414/409 |
| 4,460,188 | 7/1984 | Maloof | 280/43.24 |

Primary Examiner—John J. Love
Assistant Examiner—Michael Mar
Attorney, Agent, or Firm—Edwin E. Greigg

[57] ABSTRACT

A wheeled carriage mechanism is proposed for rendering movable large, heavy, waste containers which are otherwise immovable. The wheel carriage includes channel-like frames having wheel sets mountable on trunnions provided on the receptacle sides, the container being elevated into position off the ground and onto the wheel sets by a lever adapted to cooperate with the wheel carriage. A stabilizer bar of adjustable length is provided to be fitted between one of the wheel carriages and the receptacle so as to lock the container and prevent tipping or instability.

3 Claims, 3 Drawing Figures

U.S. Patent    Nov. 25, 1986    4,624,468
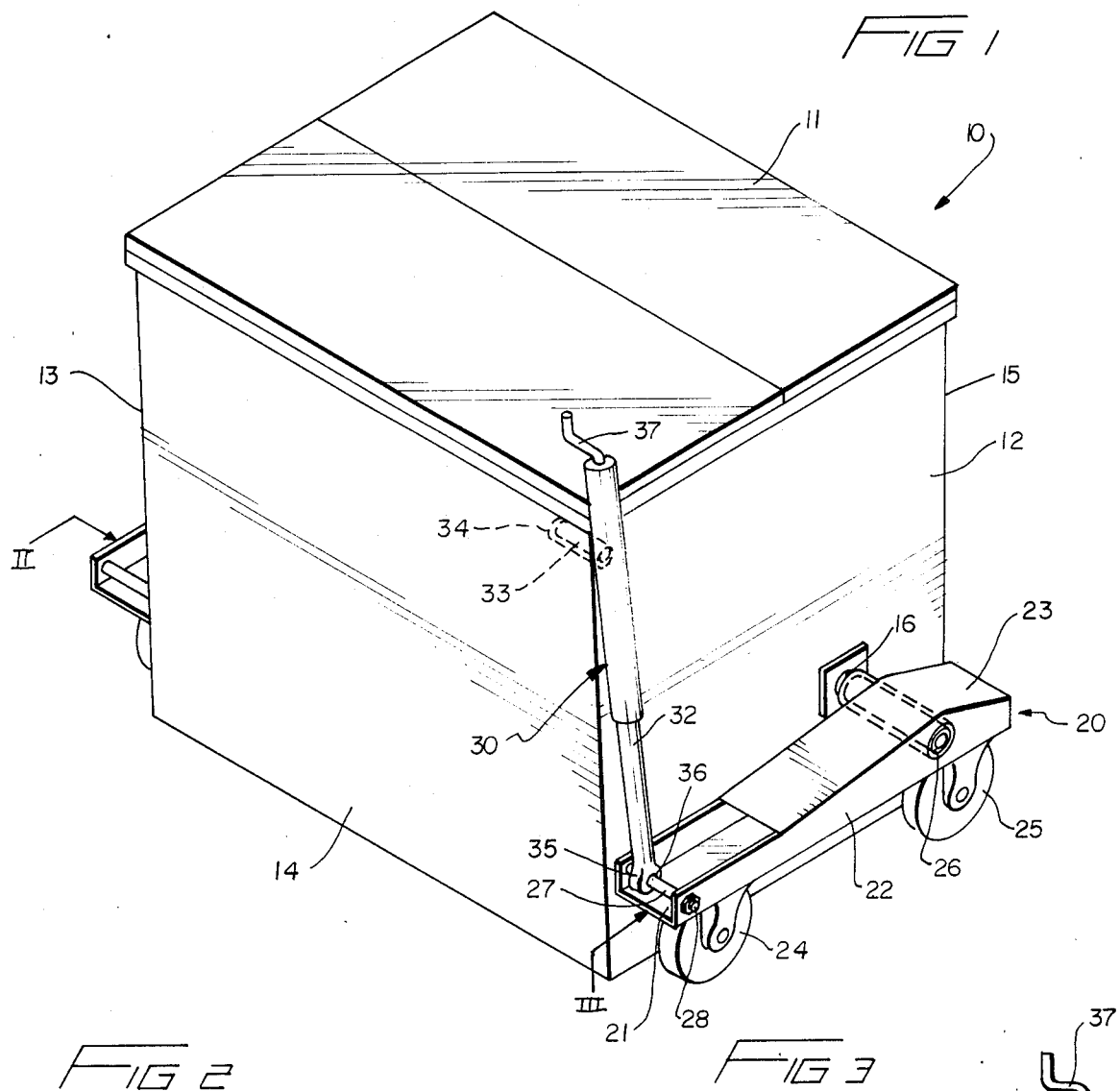
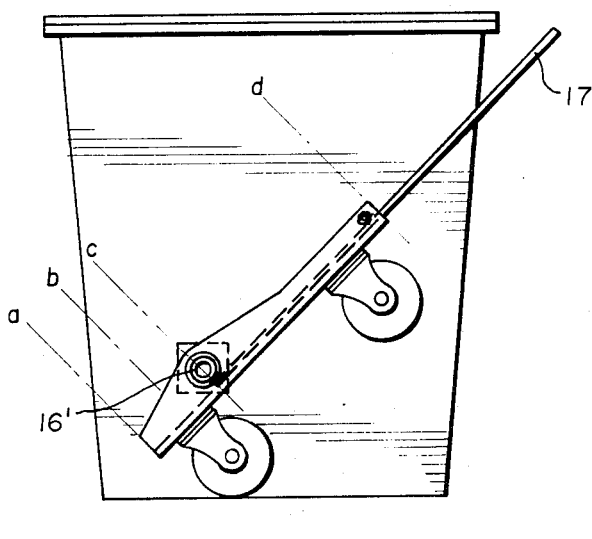

WHEEL CARRIAGE ACCESSORY FOR RENDERING WASTE CONTAINERS MOVEABLE

This is a continuation of copending application Ser. No. 650,174 filed Sept. 13, 1984 now abandoned.

BACKGROUND OF THE INVENTION

1. Field of the Invention

The invention relates to wheel carriage mechanisms, especially those which are used as an accessory and not permanently mounted on an object, and particularly objects such as waste containers and garbage receptacles.

2. Description of the Prior Art

A patent of related interest which would disclose the container which the wheel carriage mechanism disclosed hereinafter would be associated is shown in U.S. Pat. No. 4,450,828 to Donald R. Onken and Robert L. Griffin. The inventor herein is not aware at this time of other temporarily attachable non-permanent wheel carriage mechanisms or dollies which are attachable to a large heavy container to render them moveable from one position to another. Therefore, no prior art as such is cited in this application.

OBJECTS AND SUMMARY OF THE INVENTION

It is a principal object of this invention to provide a temporarily attachable wheel carriage accessory attachable to trunnions provided therefor on a waste container to render the container moveable from one spot to another.

It is another object of the invention to provide that the wheel carriage mechanism is very quickly attachable to the waste receptacle to be moved allowing it to be moved and then the wheel carriage removed for further use on another container in a different location.

It is still a further object of the invention to provide something which can be easily operated by someone who is not skilled nor of great strength.

It is yet another object of the invention to provide a wheel carriage accessory which can be used on either side of the container to which it is temporarily attached so that two different sets of wheels of different types are not necessary, thereby rendering confusion at the site of the move less of a problem.

It is yet still another object of the invention to provide a wheel carriage that can be transported by a garbage collector for use in moving or rendering moveable each of the containers which he might come upon which are adversely positioned for purposes of his being able to dump them.

It is still another object of the invention to provide a means whereby restaurants can place their deep frying grease containers out of the way of the garbage containers and yet render the grease containers moveable to where a rendering truck operator can get access to pick them up.

The invention is designed to fill a specific need for a wheel carriage mechanism which is adapted to be placed on trunnions provided on the side of containers, such as grease carrying containers, or waste receptacles, allowing a truck operator or the container owner to quickly apply the wheel carriage to opposite sides of the container and move the same about on its holding pad for improved access when dumping. No such device is known to exist at this time and the problem of dumping these things with trucks which are not easily moveable themselves to various positions on site has created problems for the owners of containers with their logistical placement and for collectors of the contents such as grease rendering plants and/or garbage collecting companies.

DESCRIPTION OF THE DRAWING

FIG. 1 is a perspective view taken from the right side of a waste receptacle showing a wheel carriage mechanism applied to it.

FIG. 2 is a side elevational view of the wheel carriage being mounted on the side of a waste receptacle before the receptacle is elevated upon the wheels; the view is taken along line II—II of FIG. 1.

FIG. 3 is a front elevational view of the waste receptacle taken along line III—III of FIG. 1 showing a pair of wheel carriage mechanisms mounted upon the trunnions of a waste receptacle, with one stabilizing bar mounted in place between one wheel carriage and the waste container.

DETAILED DESCRIPTION OF THE PREFERRED EMBODIMENT

Turning now to FIG. 1 of the drawings, the numeral 10 designates the waste receptacle to which the wheel carriage mechanism would be applied to render it moveable. The wheel carriage mechanism itself is indicated generally as numeral 20. The waste receptacle includes a lid 11, opposite side walls 12 and 13, front and rear walls 14 and 15, respectively. The oppositely disposed side walls 12 and 13 carry a pair of trunnions 16, 16', preferably mounted in off-center relationship with respect to the front and rear walls, as best shown in FIG. 2. It is conceivable, and the invention is adaptable, to the provision of centrally mounted trunnions 16 as will become clear hereinafter.

FIG. 1 shows the right side of a waste receptacle with a trunnion 16, illustrating the wheel carriage mechanism 20 already mounted in place and with the wheels supporting the container on that side in the air elevating it above the pavement. There is also shown a stabilizing bar which will be described.

The wheel carriage mechanism 20 comprises a channel-like frame member 21 having a pair of upstanding walls 22 and 22' welded on cover 23 enclosing most of the channel. The roof portion 23 for the channel-like frame could be dispensed with should the side walls 22 of the channel-like frame be strong enough to support the load imposed upon the container; however, for safety's sake and for economy of construction to use somewhat lighter materials, such as aluminum, a roof 23 has been provided to the channel-like frame structure. Wheels, such as are indicated at 24 and 25 or casters which will permit better guidance of the receptacle are applied to the forward and rearward ends of the channel-like frame structure of the wheel carriage mechanism. The opposite side walls of the channel-like frame member are provided with apertures 26 which are slightly larger than the trunnions provided on the waste receptacle. In this fashion the wheel carriage mechanism may be slipped on trunnion 16 in a position as shown in FIG. 2, to be described shortly.

Continuing FIG. 1, there is shown a stabilizing bar, adjustable for length, that bar being designated generally by numeral 30. The stabilizing bar includes two portions 31 and 32 one of which, in this case 31, is being designed to receive member 32 and be adjustable for length, as via a screw actuated mechanism, through handle 37. The stabilizing bar cooperates with the waste receptacle, as shown in the drawing, by a pin 33 which is secured to the stabilizing bar portion 31; and a socket 34 in the wall of the waste receptacle for reception of the pin 33. The pin and socket 33 and 34 comprising the locking mechanism for the stabilizing rod, could comprise instead a single flange, were the trunnions mounted off-center as shown in FIG. 2. In that case, the container when elevated upon the wheel carriage would throw most of its weight forward and in order to prohibit tipping of the container onto the lower edge of wall 14, the flange of the stabilizing bar would have to support an upper edge of the container near the lid 11. As shown in FIG. 1, with the trunnion mounted substantially on-center, the waste receptacle will have a tendency to balance between the front and rear wheels of the respective wheel carriage mechanisms and therefore only nominal support via the pin and socket locking mechanism will be required to maintain the structure stable upon the wheels. A means must be provided to attach the stabilizing bar to the wheel carriage mechanism, which as shown in FIG. 1 comprises an aperture 36 in the end 35 of the stabilizing bar. A pin 27 can be applied through the channel-like side walls of the carriage and retained by a means 28 such as a nut to hold the stabilizing bar in place. Alternatively, since the pressure rendered upon bar 27 is a downward thrust along the bar from the socket and pin locking mechanism, a full encompassing of pin 27 by end 35 of the stabilizing bar is not really necessary. It would be simpler in use to have end 35 of the stabilizer bar created in the fashion of an open end wrench, a slot being provided in end 35 for the end 35 to be slipped over the pin 27 and retained in place by the downward thrust from the weight of the container applied to the bar through the pin and socket locking mechanism. In this fashion, with the open end design, one would merely need to turn handle 37 in the direction of unscrewing the assembly so as to release the stabilizer bar from its position of engagement between the container and the channel-like frame of the wheel carriage mechanism, and upon disengagement simply slip it off the pin 27, so that the pin need not be removed from the container by unscrewing before the bar could be removed.

Turning now to FIG. 2, one can view the wheel carriage mechanism applied to a trunnion, this wheel carriage mechanism being applied to the opposite side of the container from that shown best in FIG. 1. With the wheel carriage mechanism applied to the trunnion at approximately 70° angle, a bar 17 can be inserted into the wheel carriage mechanism until an end of the bar 17 is under the trunnion 16'. This position would be indicated by the line C taken through the pivot point of the wheel carriage mechanism on trunnion 16'. It will be observed that the preferred position for the mounting of the wheel carriage on the rearward end of the wheel carriage mechanism is through a line denoted as B in FIG. 2, whereby the wheel is located substantially halfway between the end of the wheel carriage mechanism denoted by line A and line C denoting the pivot point for the wheel carriage mechanism. In actual practice it has been found that about 4½ inches in distance between the center line of the rear wheel 25 and end line A works best in placing the position in an over center usage. With the wheel in that position it lies ahead of the trunnion for leverage. As downward pressure is applied to bar 17 to press the wheel carriage down, the line B through the center of the rear wheel rotates upwardly and passes through the line taken at C through the trunnion. When the line B passes over the line C, to an overcenter position, the wheel carriage mechanism quickly descends in a snap like movement down to a position wherein both wheels are seated on the ground. Thus, pressure is only needed to be applied to the wheel carriage mechanism by the operator until such time as the wheel and trunnion are in an overcenter relation at which time the wheel carriage mechanism drops into place substantially by itself. When the wheel carriage mechanism is in place attached to one side of the container, and with that side of the container resting approximately an inch and one-half off the ground, the stabilizing bar can be applied to the forward end of the wheel carriage mechanism and locked to the container whereby the container can be supported, so that when one goes to apply another wheel carriage mechanism to the opposite side of the container in shifting the container about the opposite trunnion, the wheel carriage just applied does not shift backwardly out of position and allow the container to fall on the ground.

Finally, FIG. 3 shows a view of a finished assembly wherein the container is being supported off the ground on two wheel carriage mechanisms with a stabilizer bar applied to one side of the container, locking wheel carriage mechanism and container together in a stable form on that one side. It is not necessary to apply a stabilizer bar to both sides of the container, to support the weight that might otherwise shift, especially were the trunnions to be mounted on-center and the container to be in an easily tippable condition in terms of weight applied fore and aft of the axis of the trunnions. Thus, were the trunnion to be off center toward the rear, as shown in FIG. 2, a substantial portion of the weight of the container would be applied by gravity ahead of the axis through trunnions 16, 16', therefore, the container would have a tendency to fall onto the forward front edge, the edge below wall 14. To prohibit that from happening the stabilizer bar is applied to one or the other sides of the container to lock the container to the wheel carriage mechanism. In practice, the stabilizer bar is applied to the container on the side to which a wheel carriage is first applied, to render the container stable for the provision of the second wheel carriage. Once both wheel carriages are in place and the stabilizer bar is supporting that portion of the load which might otherwise be unstable, the container can then be shifted about on those wheel carriages.

Naturally, should the invention be desired for use on a container not then equipped with trunnions, such could be applied by bolting or welding to the container and then the invention could be used.

The foregoing relates to a preferred embodiment of the wheel carriage mechanism for use in association with a waste container, including several variants upon details thereof, and it will be understood that the above description of the present invention is acceptable to variants, modifications, changes and adaptations without departing from the spirit of the invention disclosed herein.

What is claimed and desired to be secured by Letters Patent of the United States is:

1. First and second carriages for supporting and rendering movable a waste receptacle normally resting upon a surface, said receptacle having a front wall, a back wall and oppositely disposed side walls, oppositely disposed trunnion means extending from each of said side walls normal thereto forwardly of a vertical center line and near a bottom edge of said side walls, said waste receptacle including a socket with an opening in one of said side walls at a location near said back wall and near an upper edge of said side wall,

- each of said first and second carriages comprising a channel-like longitudinal frame having a front end and a rear end, said frame having spaced vertically extending walls provided with aligned horizontal apertures, said frame further having front and rear caster means mounted under said frame, said front caster being mounted forwardly of said aligned horizontal apertures in said vertically extending walls with the distance from said aligned horizontal apertures to said front end of said frame being less than the distance from said horizontal apertures to the bottom of said front caster,
- a two-piece telescopic stabilizer bar having an upper end and a lower end the lower end being affixable to said rear end of one of said carriages,
- said stabilizer bar including means for extending and retracting said lower end and said upper end with respect to each other, and a pin extending perpendicular from said upper end,
- a lever means removably associated with one of said carriages, whereby said first and second carriages are mountable onto said oppositely disposed trunnion means on said waste receptacle at an angle relative thereto and said lever means is used to pivot each of said carriages in succession about said trunnion means thereby moving said caster means of each of said first and second carriages into contact with said surface thereby elevating said waste receptacle above said surface, and
- said pin on said stabilizer bar is extendable into said socket on said waste receptacle for positively locking said one carriage in its pivoted position with said caster means in a surface engaging position.

2. First and second carriage means for rendering movable a waste receptacle in accordance with claim 1, wherein said stabilizer means includes mechanical length adjustment means.

3. A method of mobilizing a stationary waste receptacle provided with first and second trunnion means on opposite side walls, forwardly of a vertical center line and near a bottom edge thereof from a position of rest for movement on a surface area, comprising the steps of:

(a) positioning a first front and rear wheeled carriage means having channel-like sidewalls provided with apertures therein near a front end thereof onto said first trunnion with said first trunnion mean extending through said apertures;

(b) rotating said first front and rear wheeled carriage means about said first trunnion such that said front and rear wheels thereof elevate one side of the receptacle above said surface area;

(c) securing a two-piece telescopic stabilizer bar between a rear portion of said first carriage and a socket located at an upper side portion of said waste receptacle to hold said first carriage in place to prevent said receptacle from tipping when its opposite side is raised;

(d) mounting a second front and rear wheeled carriage means having channel-like sidewalls provided with apertures therein similar to said first carriage with said second trunnion extending through the apertures of said carriage means; and (e) rotating said second front and rear wheeled carriage means about said second trunnion such that said front and rear wheels thereof elevate the other side of said receptacle above said surface area, and adjusting the length of said stabilizer bar for adjusting the height of said waste receptacle relative to said surface area for permitting movement of said receptacle to a different location.

* * * * *